United States Patent
Scherrer

(10) Patent No.: US 11,740,114 B2
(45) Date of Patent: Aug. 29, 2023

(54) CORIOLIS MASS FLOWMETER

(71) Applicant: Endress+Hauser Flowtec AG, Reinach (CH)

(72) Inventor: Rémy Scherrer, Oberdorf (FR)

(73) Assignee: Endress+Hauser Flowtec AG, Reinach (CH)

( * ) Notice: Subject to any disclaimer, the term of this patent is extended or adjusted under 35 U.S.C. 154(b) by 310 days.

(21) Appl. No.: 16/956,653

(22) PCT Filed: Nov. 15, 2018

(86) PCT No.: PCT/EP2018/081334
§ 371 (c)(1),
(2) Date: Jun. 22, 2020

(87) PCT Pub. No.: WO2019/120783
PCT Pub. Date: Jun. 27, 2019

(65) Prior Publication Data
US 2020/0408581 A1 Dec. 31, 2020

(30) Foreign Application Priority Data
Dec. 22, 2017 (DE) ...................... 10 2017 131 199.8

(51) Int. Cl.
*G01F 1/84* (2006.01)
(52) U.S. Cl.
CPC .......... *G01F 1/8431* (2013.01); *G01F 1/8413* (2013.01); *G01F 1/8422* (2013.01)
(58) Field of Classification Search
CPC ..... G01F 1/8431; G01F 1/8413; G01F 1/8422
(Continued)

(56) References Cited

U.S. PATENT DOCUMENTS 4,470,294 A 9/1984 Hamel
4,491,009 A 1/1985 Ruesch
(Continued)

FOREIGN PATENT DOCUMENTS

CN 1280668 A 1/2001
CN 1292083 A 4/2001
(Continued)

*Primary Examiner* — John Fitzgerald
*Assistant Examiner* — Rodney T Frank
(74) *Attorney, Agent, or Firm* — Christopher R. Powers; Endress+Hauser (USA) Holding, Inc.

(57) ABSTRACT

The Coriolis mass flowmeter includes a measuring tube, an exciter mechanism, a sensor arrangement, and an electronic transmitter circuit including measuring and control electronics and drive electronics connected to the measuring and control electronics. The drive electronics are adapted, in a first operating mode, to generate an electrical driver signal that supplies electrical power to the exciter mechanism such that the measuring tube executes forced oscillations having an excitation frequency and, in a second operating mode, to cease generating the electrical driver signal. The transmitter circuit is adapted to switch the drive electronics from the first operating mode to the second operating mode such that the measuring tube executes free, damped oscillations in the second operating mode, and the measuring and control electronics are adapted to, based on a phase difference between oscillation measuring signals from the sensor arrangement, to generate measured values representing the mass flow rate.

17 Claims, 4 Drawing Sheets

(58) Field of Classification Search
USPC .................................................. 73/861.355
See application file for complete search history.

(56) References Cited

U.S. PATENT DOCUMENTS

| | | | |
|---|---|---|---|
| 4,756,198 A | 7/1988 | Levien | |
| 4,777,833 A | 10/1988 | Carpenter | |
| 4,801,897 A | 1/1989 | Flecken | |
| 4,876,898 A | 10/1989 | Cage et al. | |
| 4,996,871 A | 3/1991 | Romano | |
| 5,009,109 A | 4/1991 | Kalotay et al. | |
| 5,287,754 A | 2/1994 | Kazakis | |
| 5,291,792 A | 3/1994 | Hussain et al. | |
| 5,349,872 A | 9/1994 | Kalotay et al. | |
| 5,531,126 A | 7/1996 | Drahm | |
| 5,705,754 A | 1/1998 | Keita et al. | |
| 5,796,010 A | 8/1998 | Kishiro et al. | |
| 5,796,011 A | 8/1998 | Keita et al. | |
| 5,804,742 A | 9/1998 | Rademacher-Dubbick | |
| 5,831,178 A | 11/1998 | Yoshimura et al. | |
| 5,945,609 A | 8/1999 | Kashimura et al. | |
| 5,965,824 A | 10/1999 | Kishiro et al. | |
| 6,006,609 A | 12/1999 | Drahm et al. | |
| 6,092,429 A | 7/2000 | Cunningham et al. | |
| 6,223,605 B1 | 5/2001 | Koudal et al. | |
| 6,311,136 B1 | 10/2001 | Henry et al. | |
| 6,477,901 B1 | 11/2002 | Tadigadapa et al. | |
| 6,505,518 B1 | 1/2003 | Jukes et al. | |
| 6,513,393 B1 | 2/2003 | Eckert et al. | |
| 6,651,513 B2 | 11/2003 | Wenger et al. | |
| 6,666,098 B2 | 12/2003 | Drahm et al. | |
| 6,711,958 B2 | 3/2004 | Bitto et al. | |
| 6,840,109 B2 | 1/2005 | Drahm et al. | |
| 6,920,798 B2 | 7/2005 | Wenger et al. | |
| 7,017,424 B2 | 3/2006 | Rieder et al. | |
| 7,040,181 B2 | 5/2006 | Rieder et al. | |
| 7,077,014 B2 | 7/2006 | Rieder et al. | |
| 7,200,503 B2 | 4/2007 | Lalla | |
| 7,216,549 B2 | 5/2007 | Rieder et al. | |
| 7,296,484 B2 | 11/2007 | Rieder et al. | |
| 7,325,462 B2 | 2/2008 | Bitto et al. | |
| 7,360,451 B2 | 4/2008 | Bitto et al. | |
| 7,792,646 B2 | 9/2010 | Karbula et al. | |
| 7,954,388 B2 | 6/2011 | Kuttler et al. | |
| 8,333,120 B2 | 12/2012 | Bitto et al. | |
| 8,695,436 B2 | 4/2014 | Bitto et al. | |
| 2002/0033043 A1 | 3/2002 | Dutton et al. | |
| 2006/0096390 A1 | 5/2006 | Kolahi et al. | |
| 2007/0062309 A1 | 3/2007 | Davies | |
| 2007/0119264 A1 | 5/2007 | Bitto et al. | |
| 2008/0011101 A1 | 1/2008 | Storm | |
| 2008/0047362 A1 | 2/2008 | Kassubek et al. | |
| 2008/0190195 A1 | 8/2008 | Duffill et al. | |
| 2008/0250871 A1 | 10/2008 | Rieder et al. | |
| 2010/0005887 A1 | 1/2010 | Gebhardt et al. | |
| 2010/0011882 A1 | 1/2010 | Gebhardt et al. | |
| 2010/0257943 A1 | 10/2010 | Huber | |
| 2011/0107849 A1 | 5/2011 | Yoshino et al. | |
| 2011/0161017 A1 | 6/2011 | Kumar et al. | |
| 2011/0178738 A1 | 7/2011 | Rensing et al. | |
| 2011/0219872 A1 | 9/2011 | Hussain et al. | |
| 2011/0265580 A1 | 11/2011 | Huber et al. | |
| 2011/0271756 A1 | 11/2011 | Lalla | |
| 2012/0123705 A1* | 5/2012 | Drahm | G01F 1/8436 702/183 |
| 2013/0042700 A1 | 2/2013 | Wang et al. | |
| 2014/0190238 A1 | 7/2014 | Mcanally et al. | |
| 2015/0268082 A1* | 9/2015 | Kirst | G01F 15/02 73/861.357 |
| 2016/0313162 A1 | 10/2016 | Bitto et al. | |
| 2017/0261474 A1 | 9/2017 | Zhu et al. | |
| 2020/0408581 A1 | 12/2020 | Scherrer | |

FOREIGN PATENT DOCUMENTS

| | | |
|---|---|---|
| CN | 102052944 A | 5/2011 |
| CN | 102187185 A | 9/2011 |
| CN | 102187186 A | 9/2011 |
| CN | 103154677 A | 6/2013 |
| CN | 104541136 A | 4/2015 |
| CN | 104729606 A | 6/2015 |
| CN | 105899917 A | 8/2016 |
| CN | 107209039 A | 9/2017 |
| DE | 102005044008 A1 | 3/2007 |
| DE | 102008050115 A1 | 4/2010 |
| DE | 102010044179 A1 | 5/2012 |
| EP | 0816807 A2 | 1/1998 |
| EP | 3729011 A1 | 10/2020 |
| WO | 8505677 A1 | 12/1985 |
| WO | 8802853 A1 | 4/1988 |
| WO | 8900679 A1 | 1/1989 |
| WO | 9421999 A1 | 9/1994 |
| WO | 9503528 A1 | 2/1995 |
| WO | 9516897 A1 | 6/1995 |
| WO | 9529385 A1 | 11/1995 |
| WO | 9802725 A1 | 1/1998 |
| WO | 9940394 A1 | 8/1999 |
| WO | 0019175 A1 | 4/2000 |
| WO | 0034748 A2 | 6/2000 |
| WO | 0102816 A2 | 1/2001 |
| WO | 0171291 A1 | 9/2001 |
| WO | 02060805 A2 | 8/2002 |
| WO | 2005093381 A1 | 10/2005 |
| WO | 2007043996 A1 | 4/2007 |
| WO | 2008013545 A1 | 1/2008 |
| WO | 2008059262 A1 | 5/2008 |
| WO | 2010099276 A1 | 9/2010 |
| WO | 2013092104 A1 | 6/2013 |
| WO | 2014151829 A1 | 9/2014 |
| WO | 2016058745 A1 | 4/2016 |
| WO | 2017069749 A1 | 4/2017 |
| WO | 2017123214 A1 | 7/2017 |
| WO | 2017143579 A1 | 8/2017 |
| WO | 2018028932 A1 | 2/2018 |
| WO | 2019120783 A1 | 6/2019 |

* cited by examiner

CORIOLIS MASS FLOWMETER

CROSS-REFERENCE TO RELATED APPLICATIONS

The present application is related to and claims the priority benefit of German Patent Application No. 10 2017 131 199.8, filed on Dec. 22, 2017, and International Patent Application No. PCT/EP2018/081334, filed on Nov. 15, 2018, the entire contents of which are incorporated herein by reference.

TECHNICAL FIELD

The invention relates to a Coriolis mass flowmeter with a vibration-type measuring transducer and an electronic transmitter circuit connected thereto.

BACKGROUND

Used in industrial measurements technology—especially also in connection with the control and monitoring of automated production processes—for highly accurate ascertaining of a mass flow rate of a medium, for example, a liquid, a gas or a dispersion, flowing in a process line, for example, a pipeline, are Coriolis mass flowmeters formed by means of a transmitter circuit—most often formed by means of at least one microprocessor—as well as a vibration-type measuring transducer electrically connected with the transmitter circuit and flowed through during operation by the medium to be measured. Examples of such Coriolis mass flowmeters, in given cases, also supplementally embodied as density and/or viscosity measuring devices, are described in, among others: EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0313162, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,920,798, 7,017,424, 7,040,181, 7,077,014, 7,200,503, 7,216,549, 7,296,484, 7,325,462, 7,360,451, 7,792,646, 7,954,388, 8,333,120, 8,695,436, WO-A 00/19175, WO-A 00/34748, WO-A 01/02816, WO-A 01/71291, WO-A 02/060805, WO-A 2005/093381, WO-A 2007/043996, WO-A 2008/013545, WO-A 2008/059262, WO-A 2010/099276, WO-A 2013/092104, WO-A 2014/151829, WO-A 2016/058745, WO-A 2017/069749, WO-A 2017/123214, WO-A 2017/143579, WO-A 85/05677, WO-A 88/02853, WO-A 89/00679, WO-A 94/21999, WO-A 95/03528, WO-A 95/16897, WO-A 95/29385, WO-A 98/02725, WO-A 99/40 394 and also Applicant's not pre-published international patent application PCT/EP2017/067826.

The measuring transducers of each of the Coriolis mass flowmeters shown therein comprise at least one, at least sectionally straight and/or at least sectionally bent, e.g. U-, V-, S-, Z- or Ω-shaped measuring tube having a lumen surrounded by a tube wall and serving to convey the medium.

The at least one measuring tube of such measuring transducers is adapted to convey medium in the lumen and during that to be caused to vibrate, especially in such a manner that it executes wanted oscillations, namely mechanical oscillations about a rest position with a wanted frequency also co-determined by the density of the medium and, consequently, usable as a measure for density. In the case of conventional Coriolis mass flowmeters, typically bending oscillations at a natural resonant frequency serve as wanted oscillations, for example, such bending oscillations, which correspond to a natural bending oscillation fundamental mode inherent to the measuring transducer, in which mode the oscillations of the measuring tube are resonant oscillations, which have exactly one oscillatory antinode. The wanted oscillations are in the case of an at least sectionally bent measuring tube, additionally, typically so embodied that the measuring tube moves in a pendulum-like manner, i.e. in the manner of a cantilever held on one end, about an imaginary oscillation axis imaginarily connecting an inlet end and an outlet end of the measuring tube, while, in contrast, in the case of measuring transducers having a straight measuring tube, the wanted oscillations are most often bending oscillations in a single imaginary plane of oscillation. It is, additionally, known to excite the at least one measuring tube, for example, for the purpose of executing repeating checks of the measuring transducer during operation of the Coriolis mass flowmeter, at times, also to momentarily lasting, forced oscillations outside of resonance or, at times, also to enable free, damped oscillations of the at least one measuring tube, as well as to evaluate the oscillations, for instance, in order, such as, among other things, described also in the aforementioned EP-A 816 807, US-A 2011/0178738 or US-A 2012/0123705, to detect, as early as possible, possible damage to the at least one measuring tube, damage which can bring about an undesired lessening of the accuracy of measurement and/or the operational safety of the Coriolis mass flowmeter.

In the case of measuring transducers with two measuring tubes, these are most often connected into the process line via a distributor piece extending on the inlet side between the measuring tubes and an inlet side connecting flange as well as via a distributor piece extending on the outlet side between the measuring tubes and an outlet side connecting flange. In the case of measuring transducers having a single measuring tube, the latter communicates with the process line most often via a connecting tube on the inlet side as well as via a connecting tube on the outlet side. Measuring transducers having a single measuring tube further comprise at least one, one-piece or multi-piece, for example, tube-, box- or plate-shaped, counteroscillator, which is coupled to the measuring tube on the inlet side to form a first coupling zone and which is coupled to the measuring tube on the outlet side to form a second coupling zone, and which during operation essentially rests or oscillates oppositely to the measuring tube. The inner part of the measuring transducer formed by means of measuring tube and counteroscillator is most often held alone by means of the two connecting tubes, via which the measuring tube communicates with the process line during operation, in a protective measuring transducer housing, especially in a manner enabling oscillations of the inner part relative to the measuring transducer housing. In the case of the measuring transducers shown, for example, in U.S. Pat. Nos. 5,291,792, 5,796,010, 5,945,609, 7,077,014, US-A 2007/0119264, WO-A 01/02 816 and WO-A 99/40 394 with a single, essentially straight, measuring tube, the latter and the counteroscillator are, such as quite usual in the case of conventional measuring transducers, oriented essentially coaxially relative to one another, in that the counteroscillator is embodied as an essentially straight, hollow cylinder and is so arranged in the measuring transducer that the measuring tube is jacketed, at least in part, by the counteroscillator. Considered as materials for such counteroscillators, especially also in the case of application of titanium, tantalum or zirconium for the measuring tube, are, most often, comparatively cost-effective steel types, such as, for instance, structural steel or free-machining steel.

For active exciting and maintaining of oscillations of the at least one measuring tube, not least of all also the above described wanted oscillations, vibration-type measuring transducers have, additionally, an electromechanical oscillation exciter acting during operation differentially on the at least one measuring tube and the, in given cases, present counteroscillator, or the, in given cases, present, other measuring tube. The oscillation exciter, electrically connected by means of a pair of electrical connection lines, for example, in the form of connection wires and/or in the form of conductive traces of a flexible printed circuit board, to the above described transmitter circuit, serves, especially, to convert an electrical excitation power supplied by means of an electrical driver signal generated and appropriately conditioned by a drive electronics provided in the transmitter circuit, namely an electrical driver signal at least adapted to changing oscillation characteristics of the at least one measuring tube, into a driving force acting on a point of engagement of the oscillation exciter on the at least one measuring tube. The drive electronics is, especially, also adapted so to set the driver signal by means of internal control that the driver signal has a signal frequency corresponding to the wanted frequency to be excited, which can also change as a function of time. The driver signal can, for example, during operation of the Coriolis mass flowmeter, at times, also be turned off, for example, for the purpose of enabling the above described free, damped oscillation of the at least one measuring tube or, for example, such as provided in the above mentioned WO-A 2017143579, in order to protect the drive electronics against being overloaded.

Oscillation exciters of usually marketed vibration-type measuring transducers, or Coriolis mass flowmeters, are typically built in the manner of an oscillation coil working according to the electrodynamic principle, namely formed by means of a coil—in the case of measuring transducers having a measuring tube and a counteroscillator coupled thereto, most often secured to the latter—as well as, serving as armature interacting with the at least one coil, a permanent magnet, which is secured correspondingly to the measuring tube to be moved. The permanent magnet and the coil are, in such case, usually so oriented that they extend essentially coaxially relative to one another. Additionally, in the case of conventional measuring transducers, the oscillation exciter is most often so embodied and placed such that it essentially acts at the half length point on the at least one measuring tube. Alternatively to an oscillation exciter acting at the half length point and directly on the measuring tube, such as, among others, shown in the above mentioned U.S. Pat. No. 6,092,429, for example, also exciter mechanisms formed by means of two oscillation exciters secured not at the half length point of the measuring tube, but, rather on the inlet and outlet sides thereof can be used for the active exciting of mechanical oscillations of the at least one measuring tube or, such as, among others, provided in U.S. Pat. Nos. 6,223,605 or 5,531,126, for example, also exciter mechanisms formed by means of an oscillation exciter acting between the, in given cases, present counteroscillator and the measuring transducer housing can be used.

Due to the wanted oscillations of the at least one measuring tube, not least of all also for the case in which the wanted oscillations of the at least one measuring tube are bending oscillations, as is known, Coriolis forces dependent on the instantaneous mass flow rate are induced in the flowing medium. These can, in turn, bring about Coriolis oscillations of wanted frequency superimposed on the wanted oscillations and dependent on the mass flow rate, in such a manner that, between inlet side and outlet side, oscillatory movements of the at least one measuring tube executing the wanted oscillations and simultaneously flowed through by the medium, a travel time, or phase difference, dependent on the mass flow rate, consequently, usable as measure for the mass flow measurement, can be determined. In the case of an at least sectionally bent measuring tube, in the case of which there is selected for the wanted oscillations an oscillation form, in which the measuring tube is caused to move like a pendulum in the manner of a cantilever held on one end, the resulting Coriolis oscillations correspond, for example, to a bending oscillation mode, at times also referred to as a twist mode, in which the measuring tube executes rotary oscillations about an imaginary rotary oscillation axis directed perpendicularly to the imaginary oscillation axis, while, in contrast, in the case of a straight measuring tube, whose wanted oscillations are embodied as bending oscillations in a single imaginary plane of oscillation, the Coriolis oscillations are, for example, bending oscillations essentially coplanar with the wanted oscillations.

For registering both inlet side as well as also outlet side, oscillatory movements of the at least one measuring tube, not least of all also those corresponding to the wanted oscillations, and for producing at least two electrical oscillation measuring signals influenced by the mass flow rate to be measured, measuring transducers of the type being discussed have, furthermore, two or more oscillation sensors spaced from one another along the measuring tube, for example, in each case, electrically connected by means of a suitable pair of electrical connection lines with an above described transmitter circuit. Each of the oscillation sensors is adapted to convert the above described oscillatory movements, in each case, into an oscillation measuring signal representing these oscillatory movements and containing a wanted signal component, namely a (spectral) signal component with signal frequency corresponding to the wanted frequency, and to provide the oscillation measuring signal, in each case, to the transmitter circuit, for example, to a measuring and control electronics of the transmitter circuit formed by means of at least one microprocessor, for additional, in given cases, also digital, processing. Additionally, the at least two oscillation sensors are so embodied and arranged that the oscillation measuring signals generated therewith have not only, such as already mentioned, in each case, a wanted signal component, but, instead, that additionally, also a travel time, or phase difference dependent on the mass flow rate is measurable between the wanted signal components of the oscillation measuring signals. Based on the phase difference, the transmitter circuit, or its measuring and control electronics, recurringly ascertains mass flow rate-measured values representing the mass flow rate. Besides measuring mass flow rate, supplementally also the density and/or the viscosity of the medium can be measured, for instance, based on the wanted frequency and/or on an electrical excitation power required for exciting and maintaining the wanted oscillations, or on an ascertained damping of the wanted oscillations and output by the transmitter circuit together with the measured mass flow rate in the form of qualified measured values.

Investigations with conventional Coriolis mass flowmeters have shown that, at times, a marked phase error can be observed between the above described, wanted signal components of the two oscillation measuring signals, in spite of mass flow rate remaining constant, namely an additional, equally as well, no longer negligible change of the phase difference, or that the phase difference established between the wanted signal components can, at times, have a non-mass flow rate dependent, volatile, equally as well, no longer negligible, disturbance component. This can occur, among others, in applications with media changing quickly as regards density and/or viscosity or, as regards composition, in applications with inhomogeneous media, namely media having two or more different phases, in applications with timed-, or clocked flow of a medium and even in applications with, at times, complete medium change during the measuring, such as, e.g., in filling plants or in fueling apparatuses. As discussed, among others, also in the above cited U.S. Pat. No. 7,954,388, the above-mentioned phase error can, among others, be attributed to the fact that the wanted oscillations actively excited by means of the oscillation exciter are damped asymmetrically relative to an imaginary line of action of the driving force driving the wanted oscillations, in such a manner that the excited wanted oscillations—especially also in the case of measuring transducers having a single oscillation exciter acting at the half length point on the at least one measuring tube— have a disturbance component comparable to the Coriolis oscillations. However, it has been determined by comparative measurements with a large number of nominally equally embodied Coriolis mass flowmeters operated under same measuring conditions that the above-mentioned phase error, especially also in the case of resonance, or wanted, frequency changing quickly or over a broad range, can scatter in considerable measure from measuring device to measuring device, so that, consequently, the phase error cannot be explained alone by the above-mentioned disturbance component attributed to asymmetric damping of the wanted oscillations.

SUMMARY

Starting from the above described state of the art, an object of the invention is so to improve Coriolis mass flowmeters that the above described phase error can be prevented.

For achieving the object, the invention resides in a Coriolis mass flowmeter, comprising: a measuring transducer having at least one measuring tube, an exciter mechanism and a sensor arrangement; as well as, both electrically coupled with the exciter mechanism as well as also with the sensor arrangement, and formed, for example, by means of at least one microprocessor, an electronic transmitter circuit having a measuring and control electronics electrically coupled with the sensor arrangement and a drive electronics connected, for example, electrically, with the measuring and control electronics and/or operated by the measuring and control electronics, wherein the measuring tube is adapted to convey a fluid measured substance, for example, a gas, a liquid or a dispersion, flowing at least at times and during that to be caused to vibrate, wherein the exciter mechanism is adapted to convert electrical power supplied it into mechanical power effecting forced mechanical oscillations of the at least one measuring tube, wherein the sensor arrangement is adapted to register mechanical oscillations of the at least one measuring tube and to provide a first oscillation measuring signal representing, at least in part, oscillatory movements of the at least one measuring tube as well as to provide at least a second oscillation measuring signal representing, at least in part, oscillatory movements of the at least one measuring tube, in such a manner that the first and second oscillation measuring signals follow a change of a mass flow rate of the measured substance guided in the measuring tube with a change of a phase difference, namely a change of a difference between a phase angle of the first oscillation measuring signal and a phase angle of the second oscillation measuring signal. In the case of the measuring transducer of the invention, the drive electronics is electrically connected with the exciter mechanism and is additionally, adapted, in a first operating mode, to generate an electrical driver signal and therewith to supply electrical power to the exciter mechanism, in such a manner that the at least one measuring tube executes forced mechanical oscillations having at least one wanted frequency, namely an oscillation frequency predetermined by the electrical driver signal and, for example, corresponding to a resonant frequency of the measuring transducer, and, in a second operating mode, to cease generating the electrical driver signal, in such a manner that then no electrical power is supplied by the drive electronics to the exciter mechanism. Moreover, the transmitter circuit, for example, its measuring and control electronics and/or its drive electronics, is adapted to switch the drive electronics from the first operating mode to the second operating mode, in such a manner that the at least one measuring tube in the case of drive electronics located in the second operating mode executes free, damped oscillations, at least during a measurement interval lasting, for example, more than a reciprocal of the wanted frequency and/or longer than 10 ms, and, additionally, the measuring and control electronics is adapted during the measurement interval to receive and to evaluate the first and second oscillation measuring signals, namely based on their phase difference to generate mass flow, measured values representing the mass flow rate.

Furthermore, the invention resides in using such a Coriolis mass flowmeter for measuring and/or monitoring a fluid measured substance, for example, a gas, a liquid or a dispersion, flowing, at least at times, in a pipeline, especially a measured substance, which is at least at times inhomogeneous and/or at least at times two-phase or multiphase.

In a first embodiment of the invention, it is, furthermore, provided that the sensor arrangement has for registering mechanical oscillations of the at least one measuring tube a, for example, electrodynamic, first oscillation sensor providing the first oscillation measuring signal as well as a, for example, electrodynamic—and/or embodied equally to the first oscillation sensor—second oscillation sensor providing the second oscillation measuring signal, for example, except for the first and second oscillation sensors no additional oscillation sensors.

In a second embodiment of the invention, it is, furthermore, provided that the exciter mechanism has a, for example, electrodynamic and/or single, first oscillation exciter for exciting oscillations of the at least one measuring tube.

In a third embodiment of the invention, it is, furthermore, provided that the measuring and control electronics has a first analog-to-digital converter for the first oscillation measuring signal as well as a second analog to digital converter for the second oscillation measuring signal.

In a fourth embodiment of the invention, it is, furthermore, provided that the measuring and control electronics is adapted, based on at least one of the first and second oscillation measuring signals, for example, registered in the case of drive electronics operating in the first operating mode, to detect, whether the measured substance conveyed in the at least one measuring tube is inhomogeneous.

In a fifth embodiment of the invention, it is, furthermore, provided that the drive electronics is adapted in the first operating mode, based on at least one phase difference between the driver signal and one of the first and second oscillation measuring signals, to detect, whether the measured substance conveyed in the at least one measuring tube is inhomogeneous.

In a sixth embodiment of the invention, it is, furthermore, provided that the measuring and control electronics is adapted, based on a control signal placed on the transmitter circuit, for example, based on a message transmitted therewith that the measured substance conveyed in the at least one measuring tube is inhomogeneous, and/or a control command transmitted therewith, to bring about a switching of the drive electronics from the first operating mode to the second operating mode.

In a seventh embodiment of the invention, it is, furthermore, provided that the transmitter circuit, for example, its measuring and control electronics and/or its drive electronics, is adapted to bring about a switching of the drive electronics from the first operating mode to the second operating mode, as soon as the measured substance conveyed in the at least one measuring tube is detected as inhomogeneous and/or reported as inhomogeneous.

In an eighth embodiment of the invention, it is, furthermore, provided that the transmitter circuit, for example, its measuring and control electronics and/or its drive electronics, is adapted to bring about a switching of the drive electronics from the first operating mode to the second operating mode as a function of time, for example, in such a manner that the switching occurs cyclically and/or that the drive electronics is operated predominantly in the first operating mode and/or that the drive electronics is operated in the first operating mode at least as long as it is operated in the second operating mode.

In a ninth embodiment of the invention, it is, furthermore, provided that the transmitter circuit, for example, its measuring and control electronics and/or its drive electronics, is adapted to perform a switching of the drive electronics from the first operating mode to the second operating mode cyclically, for example, in such a manner that the drive electronics change from the first operating mode to the second operating mode multiple times within a cycle and/or that the drive electronics is operated within a cycle predominantly in the first operating mode and/or that the drive electronics is operated within a cycle in the first operating mode at least so often and/or so long as in the second operating mode.

The invention rests, among other things, on the surprising discovery that, on the one hand, the driver signal generated by the excitation electronics can, as a result of electromagnetic coupling, be it within the transmitter circuit itself or be it via connection lines of the oscillation sensors and/or their coils, partially directly superimpose on each of the two oscillation measuring signals, in such a manner that, as well as also indicated in FIG. 1, the wanted signal component (S1*, S2*) of each of the oscillation measuring signals contains, supplementally to a measuring component (S1', S2') dependent on the mass flow rate, consequently actually required for its measurement, in each case, also a corresponding disturbance component (S1", S2") and accordingly the therewith, in each case, ascertained phase difference ($\Delta\varphi 12^*$) is supplementally also dependent on the disturbance components (S1", S2"), and that, on the other hand, an amplitude and/or a phase difference of the disturbance components (S1", S2") imposed thereby on the oscillation measuring signals and, equally as well, containing the wanted frequency can change with time in unpredictable manner; this, especially, also in such a manner that, as well as also indicated in FIG. 1, the amplitude and/or the phase difference of the disturbance component (S1") of one of the oscillation measuring signals differs (unpredictably) from the amplitude, or phase difference, of the disturbance component (S2") of the other oscillation measuring signal.

A basic idea of the invention is, in turn, during the registering of the wanted oscillations required for measuring mass flow rate to turn off their active excitation, namely to supply no driver signal to the exciter mechanism, whereby the—here recognized as a cause of the above described disturbance components or the phase error resulting therefrom—in-coupling of the electrical excitation signal into each of the at least two oscillation signals is prevented, and, conversely, to use for measuring mass flow rate oscillation measuring signals representing a phase difference of free, damped wanted oscillations of the at least one measuring tube, consequently oscillation measuring signals not having the above-mentioned disturbance components (S1", S2").

An advantage of the invention is, among others, that also transmitter circuits used for conventional Coriolis mass flowmeters—for example, known from the above cited U.S. Pat. No. 6,311,136 and even available from the Applicant in Coriolis mass flowmeters (http://www.endress.com/de/messgeraete-fuer-die-prozesstechnik/produktfinder?filter-.business-area=flow&filter.measuring-principle-parameter=coriolis&filtertext=)—can, in principle, be applied for the present invention, namely, in given cases, alone by installing comparatively small modifications of their firmware.

BRIEF DESCRIPTION OF THE DRAWINGS

The invention as well as advantageous embodiments thereof will now be explained in greater detail based on examples of embodiments shown in the figures of the drawing. Equal, or equally acting or equally functioning parts are provided in all figures with equal reference characters; when perspicuity requires or it otherwise appears sensible, reference characters already shown in earlier figures are omitted in subsequent figures. Other advantageous embodiments or further developments, especially also combinations of, firstly, only individually explained aspects of the invention, result, furthermore, from the figures of the drawing and/or from claims per se.

The figures of the drawing show as follows.

DETAILED DESCRIPTION

Figure 2:
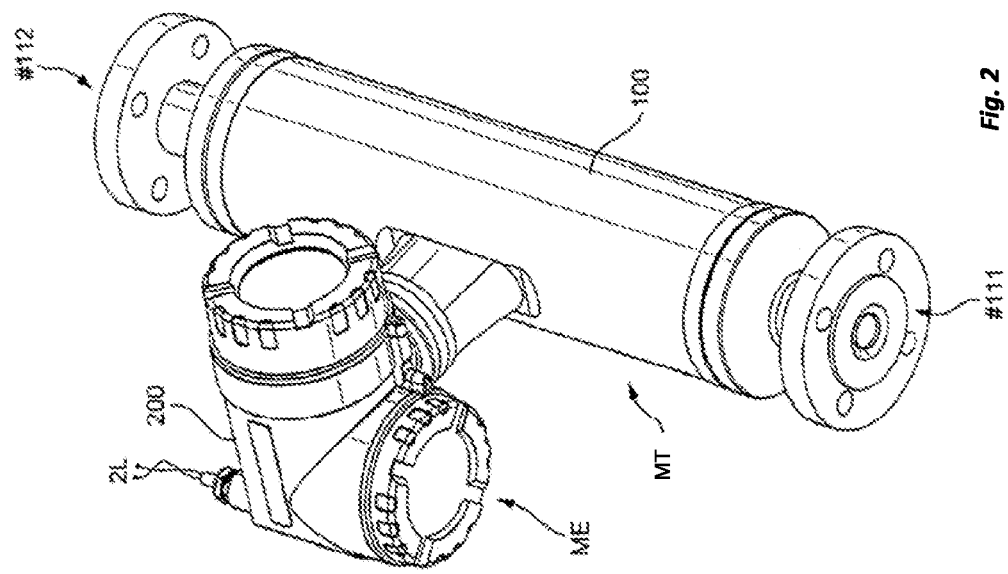
FIG. 2 shows a Coriolis mass flowmeter embodied here as a compact measuring device.
Figure 3:
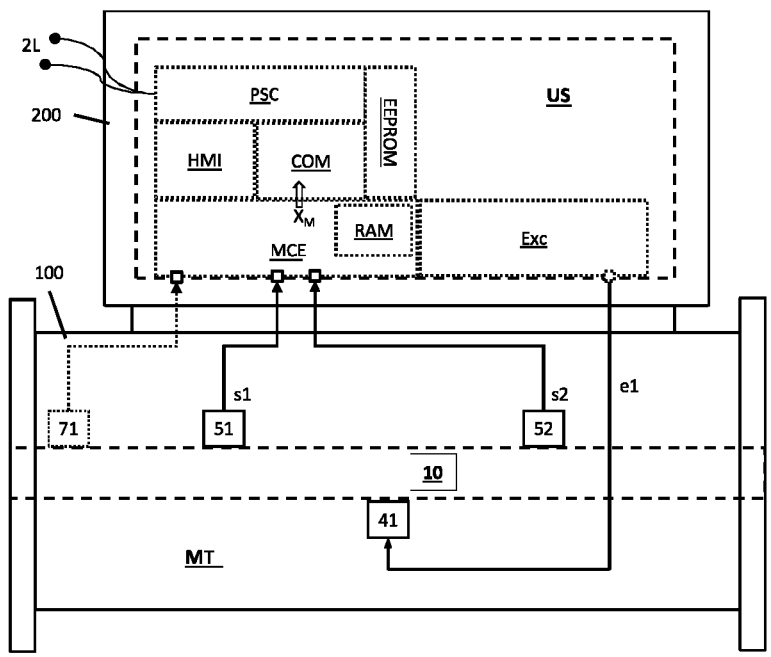
FIG. 3 shows schematically in the manner of a circuit diagram, a transmitter circuit, especially one suitable for a Coriolis mass flowmeter of FIG. 2, with vibration-type measuring transducer connected thereto, e.g. a Coriolis mass flowmeter of FIG. 2.

Shown in FIGS. 2 and 3 is a Coriolis mass flowmeter insertable into a process line (not shown)—such as e.g. a pipeline of an industrial plant, for example, of a filling, or bottling, plant or a fueling apparatus—for measuring flowable, especially fluid or pourable, media, for example, also an inhomogeneous measured substance, which is, at least at times, two-phase or multiphase. The Coriolis mass flowmeter serves, especially, for measuring and/or monitoring a mass flow rate m, e.g., ascertaining mass flow, measured values $X_M$ representing the mass flow rate of a fluid measured substance, for example, a gas, a liquid or a dispersion, contained in the above described process line, and, at least at times, caused to flow therein. Furthermore, the Coriolis mass flowmeter can serve supplementally also to ascertain a density p and/or a viscosity of the measured substance. In an embodiment of the invention, the Coriolis mass flowmeter is used for ascertaining mass flow, measured values of a measured substance to be transferred, for example, in a predetermined, or predeterminable, amount from a supplier to a customer, for example, a measured substance in the form of a liquefied gas, such as, e.g., a methane and/or ethane and/or propane and/or butane containing, liquefied gas, or a liquefied natural gas (LNG) and even a mixture formed by means of liquid hydrocarbons, for example, petroleum or a liquid fuel. The Coriolis mass flowmeter can, accordingly, for example, also be embodied as a component of a transfer location for traffic in goods, where certification is obligatory, such as, for instance, a filling plant, and/or as a component of a transfer location in the manner of transfer locations shown in WO-A 02/060805, WO-A 2008/013545, WO-A 2010/099276, WO-A 2014/151829 or WO-A 2016/058745.

The Coriolis mass flowmeter—for example, one supplementally implemented also as a density- and/or viscosity measuring device—comprises a physical to electrical measuring transducer MT connected via an inlet end #111 as well as an outlet end #112 to the process line. The measuring transducer MT is adapted to be flowed through during operation by the measured substance. The Coriolis mass flowmeter further comprises an electronic transmitter circuit ME (measuring electronics) electrically coupled with the measuring transducer MT—especially an electronic transmitter circuit supplied with electrical energy during operation by means of an internal energy storage and/or from the exterior via connection cable.

In advantageous manner, the, for example, also programmable and/or remotely parameterable, transmitter circuit ME, can, furthermore, be so designed that it can exchange measuring—and/or other operating data, such as, for instance, current measured values or setting values serving for the control of the measuring system—and/or diagnostic values, during operation of the Coriolis mass flowmeter with an electronic data processing system superordinated thereto (not shown), for example, a programmable logic controller (PLC), a personal computer and/or a work station, via a data transmission system, for example, a fieldbus system and/or wirelessly per radio. Accordingly, the transmitter circuit ME can have, for example, an interface electronics, which is fed during operation from a (central) evaluating and supply unit provided in the above described data processing system and remote from the measuring system. For example, the transmitter circuit ME (in particular, its above-mentioned interface electronics) can be so embodied that it is electrically connectable with the external electronic data processing system via a two-conductor connection 2L, in given cases, also configured as a 4-20 mA electrical current loop, and via that can both draw from the above described evaluating- and supply unit of the data processing system the electrical power required for operation of the Coriolis mass flowmeter as well as also transfer measured values to the data processing system, for example, by (load) modulation of a direct current supplied from the evaluating and supply unit. Additionally, the transmitter circuit ME can also be so embodied that it can be operated nominally with a maximum power of 1 W or less and/or is intrinsically safe.

In the case of the measuring transducer MT, it is a vibration-type measuring transducer, namely a measuring transducer having at least one measuring tube 10, with an exciter mechanism 41 and a sensor arrangement 51, 52, wherein the at least one measuring tube 10 is adapted to convey the fluid measured substance flowing at least at times (i.e., to be flowed through by the measured substance) and during that to be caused to vibrate. The at least one measuring tube 10 can, as well as also indicated in FIG. 3 or directly evident from a combination of FIGS. 2 and 3, be accommodated together with the exciter mechanism 41 and the sensor arrangement, as well as, in given cases, additional components of the measuring transducer, within a transducer housing 100. The measuring transducer can be, for example, one known from the state of the art, not least of all one described in one of the above mentioned documents, EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0313162, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,920,798, 7,017,424, 7,040,181, 7,077,014, 7,200,503, 7,216,549, 7,296,484, 7,325,462, 7,360,451, 7,792,646, 7,954,388, 8,333,120, 8,695,436, WO-A 00/19175, WO-A 00/34748, WO-A 01/02816, WO-A 01/71291, WO-A 02/060805, WO-A 2005/093381, WO-A 2007/043996, WO-A 2008/013545, WO-A 2008/059262, WO-A 2010/099276, WO-A 2013/092104, WO-A 2014/151829, WO-A 2016/058745, WO-A 2017/069749, WO-A 2017/123214, WO-A 2017/143579, WO-A 85/05677, WO-A 88/02853, WO-A 89/00679, WO-A 94/21999, WO-A 95/03528, WO-A 95/16897, WO-A 95/29385, WO-A 98/02725, WO-A 99/40 394 or PCT/EP2017/067826, or a conventional vibration-type measuring transducer. The exciter mechanism of the measuring transducer is accordingly adapted to convert electrical power supplied to it into mechanical power effecting forced mechanical oscillations of the at least one measuring tube, while the sensor arrangement of the measuring transducer is adapted to register mechanical oscillations of the at least one measuring tube 10 and to provide a first oscillation measuring signal s1 representing at least in part oscillatory movements of the at least one measuring tube as well as at least a second oscillation measuring signal s2 representing at least in part oscillatory movements of the at least one measuring tube; this, especially, in such a manner that the oscillation measuring signals follow a change of the mass flow rate of the measured substance guided in the measuring tube with a change of at least one phase difference $\Delta\varphi 12$ ($\Delta\varphi 12^*$), namely a change of at least one difference between a phase angle $\varphi 1$ of the oscillation measuring signal s1 (or one of its spectral signal components) and a phase angle $\varphi 2$ of the oscillation measuring signal s2 (or one of its spectral signal components). Moreover, the oscillation measuring signals s1, s2 can have at least one signal frequency and/or signal amplitude dependent on the density and/or the viscosity of the measured substance. In an additional embodiment of the invention, the sensor arrangement of the invention includes a first oscillation sensor 51, for example, an electrodynamic or piezoelectric or capacitive first oscillation sensor 51, arranged on the inlet side of the at least one measuring tube, or applied near to it, as well as a second oscillation sensor 52, for example, and electrodynamic or piezoelectric or capacitive second oscillation sensor 52, arranged on the outlet side of the at least one measuring tube, or applied near to it. As quite usual in the case of vibration-type measuring transducers, or as also indicated in FIG. 3, the oscillation sensors 51, 52 can, for example, also be positioned, in each case, with the same separation from the half length point of the at least one measuring tube 10. Additionally, the two oscillation sensors 51, 52 can also be single oscillation sensors serving for registering oscillations of the at least one measuring tube 10, in such a manner that the sensor arrangement has except for the oscillation sensors 51, 52 no additional oscillation sensors. In an additional embodiment of the invention, the exciter mechanism is formed by means of at least one electromechanical, for example, electrodynamic, electromagnetic or piezoelectric oscillation exciter 41, which, as well as also indicated in FIG. 3, can, for example, be positioned at the half length point of the at least one measuring tube 10 and/or even be the single oscillation exciter of the exciter mechanism effecting oscillations of the at least one measuring tube, or of the measuring transducer formed therewith. Moreover, there can be provided in the measuring transducer, for example, also a temperature measuring arrangement 71 serving for registering temperatures within the tube arrangement and/or a strain measuring arrangement serving for registering mechanical stresses within the tube arrangement.

For processing the oscillation measuring signals s1, s2 delivered by the measuring transducer, the transmitter circuit ME includes, furthermore, a measurement and control electronics MCE. The measuring and control electronics MCE, as shown schematically in FIG. 3, is electrically connected with the measuring transducer MT, e.g. its sensor arrangement 51, 52, and is adapted to receive and to evaluate the above described oscillation measuring signals s1, s2, namely based on the at least two oscillation measuring signals s1, s2 to ascertain mass flow measured values—analog and/or digital—representing the mass flow rate, in given cases, also to output such, for example, in the form of digital values. The oscillation measuring signals s1, s2 generated by the measuring transducer MT and the transmitter circuit ME, and supplied to the therein provided measuring and control electronics MCE, for example, via electrical connection lines, can, in given cases, be, firstly, preprocessed, for example, preamplified, filtered and digitized. In an additional embodiment of the invention, the measuring and control electronics MCE includes accordingly a first measuring signal input for the oscillation measuring signal s1 as well as at least a second measuring signal input for the oscillation measuring signal s2 and the measuring and control electronics MCE is, furthermore, adapted to ascertain from the oscillation measuring signals s1, s2 the above-mentioned phase difference. Additionally, the measuring and control electronics MCE can also be adapted to ascertain from at least one of the applied oscillation measuring signals s1, s2 the above-mentioned phase angle and/or at least one signal frequency and/or a signal amplitude, for example, to generate during operation, in each case, a sequence of digital phase values representing the phase angle and/or a sequence of digital frequency values representing the signal frequency and/or a sequence of digital amplitude values representing the signal amplitude. In an additional embodiment of the invention, the measuring and control electronics MCE provides a digital phase output as well as a digital amplitude output. Additionally, the measuring and control electronics MCE is, furthermore, also adapted to output on the amplitude output an amplitude sequence, namely a sequence of digital amplitude values ascertained based on at least one of the oscillation measuring signals and, for example, quantifying the signal amplitude of one of the oscillation measuring signals, and to output on the phase output a phase sequence, namely a sequence of digital phase values ascertained based on the oscillation measuring signals.

The measuring and control electronics MCE can, for example, also be implemented by means of a microcomputer provided in the transmitter circuit ME, for example, implemented by means of a digital signal processor DSP, and by means of program-code correspondingly implemented and running therein. The program-code can be stored persistently, e.g., in a non-volatile data memory EEPROM of the microcomputer and be loaded upon start of the same into a volatile data memory RAM, e.g. integrated in the microcomputer. The oscillation measuring signals s1, s2 are, such as already indicated, for processing in the microcomputer, converted by means of corresponding analog-to-digital (A/D) converters of the measuring and control electronics MCE, or the transmitter circuit ME formed therewith, into corresponding digital signals, compare, for this, for example, the above cited U.S. Pat. No. 6,311,136 or US-A 2011/0271756. Accordingly, there are provided in the measuring and control electronics according to an additional embodiment a first analog to digital converter for the first oscillation measuring signal as well as a second analog to digital converter for the second oscillation measuring signal.

Figure 4:
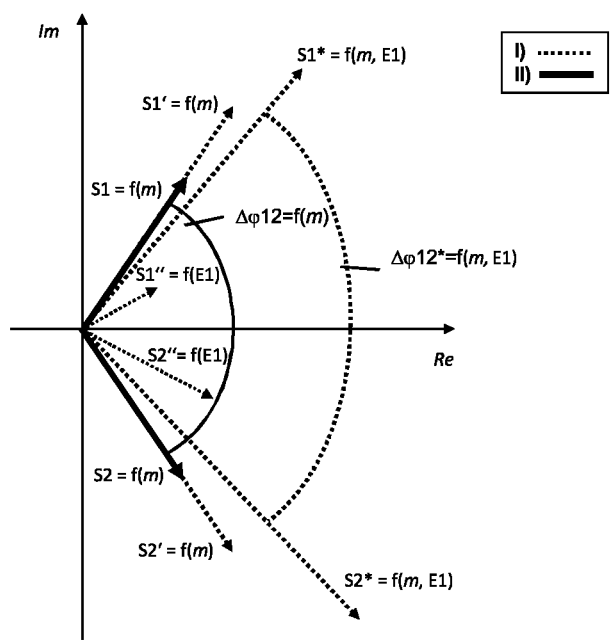
FIG. 4 shows a phasor-diagram_for signal components of oscillation measuring signals generated by means of a Coriolis mass flowmeter of FIG. 2, or by means of a transmitter circuit of FIG. 3 connected to a vibration-type measuring transducer.

For driving the measuring transducer, the transmitter circuit ME includes, as well as also schematically shown in FIG. 3 in the manner of a block diagram, furthermore, a drive electronics Exc electrically coupled both with the exciter mechanism—for example, connected with the exciter mechanism via electrical connection lines—as well as also with the measuring and control electronics MCE, for example, connected, or electrically coupled via a transmitter circuit internal, digital bus. The drive electronics Exc is, especially, adapted to be operated at times in a first operating mode I and in the first operating mode I to generate a, for example, bipolar and/or at least at times periodic, in given cases, also harmonic, electrical driver signal e1 and therewith to supply electrical power to the exciter mechanism, in such a manner that the at least one measuring tube executes forced mechanical oscillations (for example, also oscillations effecting Coriolis forces in the measured substance flowing through the at least one measuring tube) with at least one wanted frequency $f_w$, namely an oscillation frequency predetermined by the electrical driver signal e1, or a (wanted-)signal component E1 thereof, especially corresponding to a resonant frequency of the measuring transducer, or that each of the oscillation measuring signals s1, s2 contains, as well as also indicated in FIG. 4, in each case, a wanted signal component S1*, or S2*, namely a (spectral) signal component with signal frequency corresponding to the wanted frequency. The driver signal e1 can, accordingly, be, for example, a harmonic electrical signal forming the above-mentioned signal component E1 determining the wanted frequency $f_w$, or, for example, also an electrical signal composed of a plurality of (spectral) signal components, equally as well, containing the above-mentioned signal component E1, thus a multi-frequent electrical signal, which, in given cases, can also be periodic for a predeterminable time period. For setting, or measuring, the wanted frequency $f_w$, the drive electronics can have, such as quite usual in the case of Coriolis mass flowmeters, for example, one or more phase control loops (PLL—phase locked loop). In an additional embodiment of the invention, the drive electronics Exc has a digital frequency output. Additionally, the drive electronics Exc is, furthermore, also adapted to output on the frequency output a frequency sequence, namely a sequence of digital frequency values quantifying the signal frequency set for the driver signal e1, for example, the instantaneously set, wanted frequency (i.e., the signal frequency of its signal component E1). In an additional embodiment of the invention, it is, furthermore, provided that the above-mentioned phase output of the measuring and control electronics MCE is electrically connected with a phase input formed, for example, by means of a phase comparator provided within the drive electronics Exc. The phase comparator can, for example, also be adapted to detect a phase difference between the above referenced signal component E1 of the driver signal e1 and at least one of the above described, wanted components S1*, S2* and/or to ascertain an extent of the phase difference. Moreover, the amplitude output of the measuring and control electronics MCE can additionally be electrically connected correspondingly with an amplitude input of the drive electronics Exc registering the amplitude of the signal component, or of the oscillations of the at least one measuring tube excited therewith.

The drive electronics Exc and the measuring and control electronics MCE as well as other electronic components of the transmitter circuit ME serving for the operation of the measuring system, such as, for instance, an internal power supply circuit PSC for providing internal direct voltages and/or a transmitting and receiving electronics COM serving for communication with a superordinated measurement data processor system, or an external fieldbus, as well as also directly evident from a combination of FIGS. 2 and 3, can furthermore be accommodated, for example, in a corresponding, especially impact and/or explosion resistant and/or hermetically sealed, electronics housing 200. The electronics housing 200, for example, as well as also shown in FIGS. 2 and 3, can be connected with the aforementioned transducer housing 100 to form a Coriolis mass flowmeter in compact construction. For presenting measuring device internally produced measured values and/or, in given cases, measuring system internally generated status messages, such as, for instance, a failure message or an alarm, on-site, the measuring system can have, furthermore, a display- and interaction element HMI communicating, at least at times, with the measuring and control electronics MCE, such as, for instance, an LCD, OLED or TFT display as well as a corresponding input keypad and/or a touch screen placed in the aforementioned electronics housing 200 behind a window pane correspondingly provided therein. The electrical connecting of the measuring transducer MT with the transmitter circuit ME can occur by means of corresponding electrical connection lines and corresponding electrical cable feedthroughs. The connection lines can be embodied, in such case, at least in part, as electrical cable wires surrounded, at least sectionally, with electrical insulation, e.g., in the form of "twisted-pair" lines, flat ribbon cables and/or coaxial cables. Alternatively thereto or in supplementation thereof, the connection lines can at least sectionally also be formed by means of conductive traces of an, especially flexible, in given cases, lacquered, printed circuit board.

Figure 1:
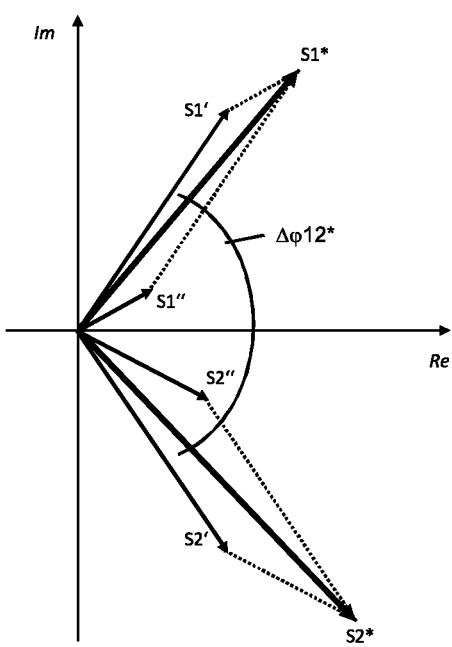
FIG. 1 shows a vector diagram of signal components of oscillation measuring signals generated by means of conventional Coriolis mass flowmeters.

The above referenced forced mechanical oscillations excited by means of exciter mechanism 41 and drive electronics Exc connected thereto can, such as quite usual in the case of Coriolis mass flowmeters, for example, be bending oscillations of the at least one measuring tube 10 around an associated rest position, wherein set as wanted frequency $f_w$ can be, for example, an instantaneous resonant frequency of a bending oscillation fundamental mode of the at least one measuring tube 10 having only a single oscillatory antinode, wherein the resonant frequency is also dependent on the density and/or the viscosity of the measured substance guided in the measuring tube. As a result of the forced oscillations of the at least one measuring tube 10, for example, the above described bending oscillations, as is known, Coriolis forces are generated in the measured substance flowing through the at least one measuring tube; this, especially, in such a manner that each of the previously indicated wanted signal components S1*, S2* of the oscillation measuring signals s1, s2 has, in each case, a measurement component S1', or S2' having a signal frequency corresponding to the wanted frequency $f_w$ and a phase angle dependent on the mass flow rate m of the measured substance flowing through the measuring transducer MT (S1'=f (m), S2'S1'=f(m)), consequently, as well as also indicated in FIG. 4, there exists between the measuring component S1' of the oscillation signal 51 and the measuring component S2' of the oscillation signal s2 a phase difference $\Delta\varphi 12$ ($\Delta\varphi 12$=f (m)) dependent on the mass flow rate m. However, it has been found that in the case of drive electronics Exc operating in the first operating mode, i.e., in the case of driver signal e1 supplied to the exciter mechanism, each of the oscillation measuring signals s1, s2, as well as also indicated in FIG. 4 or evident from a combination of FIGS. 1 and 4, can have, besides the above described measuring component S1', S2', additionally, in each case, an undesired, disturbance component S1", S2" of frequency equal to that of the measuring component S1', S2', with, in each case, a phase angle dependent on the above described signal component E1 of the driver signal e1 and, in each case, likewise an amplitude dependent on the signal component E1. As also indicated in FIG. 4, the phase angle and/or the amplitude of the disturbance components S1", S2" can differ, in each case, from one another. Additionally, the phase angle and amplitude can vary during operation, for example, as a result of a changing wanted frequency and/or a changing amplitude of the signal component E1. Due to the disturbance component S1", S2" contained in the oscillation measuring signals s1, s2, and their wanted signal components S1*, S2*, a phase difference $\Delta\varphi 12^*$ actually measurable in the case of drive electronics Exc operating in the first operating mode between the wanted signal components S1*, S2* does not just depend on the mass flow rate m ($\Delta\varphi 12^*$=f(m, E1)), or, conversely, the phase difference $\Delta\varphi 12^*$ can, as well as also evident from FIG. 4, significantly deviate from the phase difference 412 between the measuring components S1', S2' ($\Delta\varphi 12^* \neq \Delta\varphi 12$).

For the purpose of eliminating the above described disturbance component S1", S2" from the oscillation measuring signals s1, s2, the drive electronics Exc of the Coriolis mass flowmeter of the invention is, consequently, furthermore, adapted during operation of the same, at times, to be operated in a second operating mode, for example, in the second operating mode II different from the above described first operating mode I and in the second operating mode to stop generating the electrical driver signal e1, in such a manner that then no electrical power is supplied from the drive electronics to the exciter mechanism; this namely, e.g., also in such a manner that the forced mechanical oscillations of the at least one measuring tube are replaced by free, damped oscillations.

Moreover, the drive electronics and/or the measuring and control electronics MCE is, furthermore, adapted, during operation of the Coriolis mass flowmeter to bring about, or at least to allow to happen, both a switching of the drive electronics Exc from the first operating mode to the second operating mode in such a manner that the at least one measuring tube 10 executes free, damped oscillations in the case of drive electronics located in the second operating mode at least during a, for example, predetermined and/or adaptable, measurement interval, as well as also, during the measurement interval, to receive and to evaluate the oscillation measuring signals s1, s2, namely based on their phase difference $\Delta\varphi 12^*$ to generate mass flow, measured values $X_M$ representing the mass flow rate m. The measurement interval therefor can, for example, be so selected that it lasts longer than 10 ms, for example, also more than 100 ms, and/or that it is greater than a reciprocal ($1/f_w$) of the wanted frequency, for example, even more than 5-times the reciprocal. As also evident from FIG. 4, a temporary interrupting, or turning off, of the driver signal e1 can, on the one hand, indeed, lead to the fact that an amplitude (|S1|, |S2|) of each of the wanted signal components S1, S2 of the oscillation measuring signals s1, s2 received during the measurement interval can be significantly less compared with the amplitudes (|S*1|, |S*2|) of each of the wanted signal components S1*, S2* registered in the case of drive electronics Exc operating in the first operating mode I. On the other hand, this turning off of the driver signal e1 leads, especially, also to the fact that the wanted signal components S1, S2 then due to the absence of the driver signal e1 do not, or no longer, contain the above described disturbance components S1", S2" and, as a result, essentially correspond to the measuring components S1', S2', so that then the measurable phase difference $\Delta\varphi 12^*$ between the wanted signal components S1, S2, corresponds very exactly to the phase difference $\Delta\varphi 12$ actually required for measuring mass flow rate m ($\Delta\varphi 12^* = \Delta\varphi 12$).

In an additional embodiment of the invention, the transmitter circuit, for example, its measuring and control electronics and/or its drive electronics is, furthermore, adapted to bring about, or to perform as a function of time, the switching of the drive electronics from the first operating mode to the second operating mode, for example, also in such a manner that such switching, and, conversely, a switching from the second back to the first operating mode occurs cyclically, or within a predetermined, or predeterminable, period of time, time clocked and multiple times. The measuring and control electronics and/or the drive electronics can, for example, be adapted cyclically to complete the switching of the drive electronics from the first operating mode to the second operating mode, in such a manner that the drive electronics transfers multiply within a cycle from the first operating mode to the second operating mode and vice versa and/or that the drive electronics is operated within one cycle predominantly in the first operating mode and/or that the drive electronics within a cycle is operated in the first operating mode at least so often and/or as long as in the second operating mode.

Alternatively or supplementally, the transmitter circuit can also be adapted recurringly to test during operation, whether the switching of the drive electronics from the first operating mode to the second operating mode, for instance, due to an inhomogeneous measured substance in the at least one measuring tube, is in order, or required, and, in given cases, to make the switching happen. For such purpose, according to an additional embodiment of the invention, the measuring and control electronics MCE is adapted, based on at least one of the oscillation measuring signals s1, s2, for example, an oscillation measuring signal s1, s2 registered in the case of drive electronics Exc operating in the first operating mode I, and/or the drive electronics Exc is adapted in the first operating mode I based on at least one phase difference between the driver signal e1 and one of the oscillation measuring signals s1, s2, for example, a phase difference established between the above referenced signal component E1 of the driver signal e1 and at least one of the above described wanted components S1*, S2*, and/or a controlling of the above-mentioned phase control loop of the drive electronics, to detect, whether the measured substance conveyed in the at least one measuring tube is inhomogeneous. For example, the drive electronics Exc can be adapted to compare the phase difference with a predetermined, phase difference-threshold value representing inhomogeneous measured substance and upon an exceeding of the phase difference-threshold value automatically to perform the switching into the second operating mode, in given cases, after this, also correspondingly to report such to the measuring and control electronics MCE. Other ways of using the drive electronics or the measuring and control electronics or both for determining an inhomogeneous measured substance by means of a transmitter circuit of the type being discussed, for example, based on time rate of change of the wanted frequency, the oscillation amplitude and/or a damping of the wanted oscillations, etc., are known, per se, to those skilled in the art and are disclosed in, among others, also the above mentioned US-A 2008/0011101, U.S. Pat. Nos. 6,311,136, 7,296,484, 7,040,181, WO-A 00/19175, and WO-A 01/71291. Alternatively or supplementally to the above discussed automatic detection of inhomogeneous measured substance in the at least one measuring tube, the transmitter circuit can, furthermore, also be adapted, based on a control signal applied thereto (from the exterior), to bring about a switching of the drive electronics from the first operating mode to the second operating mode. The control signal can, for example, be produced by and be sent from the above referenced data processing system connected to the Coriolis mass flowmeter and the data processing system can, for example, send a message classifying the measured substance as inhomogeneous and/or transfer to the transmitter circuit, or to the Coriolis mass flowmeter formed therewith, a control command triggering the switching from the first to the second operating mode.

The invention claimed is:
1. A Coriolis mass flowmeter, comprising:
   a measuring transducer including:
      at least one measuring tube, wherein the measuring tube is configured to convey a fluid medium to be measured flowing at least at times and during such to be caused to vibrate;
      an exciter mechanism, wherein the exciter mechanism is configured to convert electrical power supplied thereto into mechanical power effecting forced mechanical oscillations of the at least one measuring tube; and a sensor arrangement, wherein the sensor arrangement is configured to register mechanical oscillations of the at least one measuring tube and to provide a first oscillation measuring signal representing, at least in part, oscillatory movements of the at least one measuring tube and to provide at least a second oscillation measuring signal representing, at least in part, oscillatory movements of the at least one measuring tube such that the first and second oscillation measuring signals follow a change of a mass flow rate of the medium conveyed in the at least one measuring tube with a change of a phase difference between a phase angle of the first oscillation measuring signal and a phase angle of the second oscillation measuring signal; and an electronic transmitter circuit including at least one microprocessor, measuring and control electronics and drive electronics, wherein the transmitter circuit is electrically coupled with the exciter mechanism and the sensor arrangement, and wherein the drive electronics is electrically connected to the measuring and control electronics and driven by the measuring and control electronics, wherein the drive electronics is electrically connected with the exciter mechanism and is configured:

in a first operating mode, to generate an electrical driver signal and therewith to supply electrical power to the exciter mechanism such that the at least one measuring tube executes forced mechanical oscillations having at least one wanted frequency at an oscillation frequency predetermined by the electrical driver signal; and in a subsequent second operating mode, to cease generating the electrical driver signal such that no electrical power is supplied by the drive electronics to the exciter mechanism, wherein the measuring and control electronics is electrically coupled with the sensor arrangement, wherein the transmitter circuit is configured to switch the drive electronics from the first operating mode to the second operating mode such that, in the second operating mode, the at least one measuring tube subsequently executes free, damped oscillations during a measurement interval, and wherein the measuring and control electronics is configured to receive and to evaluate the first and second oscillation measuring signals during the measurement interval and to generate measured values representing the mass flow rate based on the phase difference between the phase angle of the first oscillation measuring signal and the phase angle of the second oscillation measuring signal.

2. The flowmeter of claim 1, wherein the at least one wanted frequency in the first operating mode is at an oscillation frequency corresponding to a resonant frequency of the measuring transducer.

3. The flowmeter of claim 1, wherein the sensor arrangement includes:

an electrodynamic first oscillation sensor configured to register mechanical oscillations of the at least one measuring tube and to provide the first oscillation measuring signal; and an electrodynamic second oscillation sensor configured to register mechanical oscillations of the at least one measuring tube and to provide the second oscillation measuring signal.

4. The flowmeter of claim 3, wherein the first oscillation sensor is disposed at an inlet side of the at least one measuring tube, and the second oscillation sensor is disposed at an outlet side of the at least one measuring tube.

5. The flowmeter of claim 3, wherein the sensor arrangement includes no other oscillations sensors besides the first oscillation sensor and the second oscillation sensor.

6. The flowmeter of claim 1, wherein the exciter mechanism includes an electrodynamic first oscillation exciter configured to excite oscillations of the at least one measuring tube.

7. The flowmeter of claim 1, wherein the measuring and control electronics includes a first analog-to-digital transducer for the first oscillation measuring signal and a second analog-to-digital transducer for the second oscillation measuring signal.

8. The flowmeter of claim 1, wherein the measuring and control electronics is configured to detect, when the drive electronics are operating in the first operating mode, whether the medium conveyed in the at least one measuring tube is inhomogeneous based on at least one of the first oscillation measuring signal and second oscillation measuring signal.

9. The flowmeter of claim 1, wherein the drive electronics is configured to detect, in the first operating mode, whether the medium conveyed in the at least one measuring tube is inhomogeneous based on at least one phase difference between the driver signal and one of the first and second oscillation measuring signals.

10. The flowmeter of claim 1, wherein the measuring and control electronics is configured to effect a switching of the drive electronics from the first operating mode to the second operating mode based on a control signal placed on the transmitter circuit.

11. The flowmeter of claim 10, wherein the control signal placed on the transmitter circuit includes a message and/or a control command transmitted therewith that the medium conveyed in the at least one measuring tube is inhomogeneous.

12. The flowmeter of claim 1, wherein the transmitter circuit is configured to effect a switching of the drive electronics from the first operating mode to the second operating mode when the medium conveyed in the at least one measuring tube is detected as inhomogeneous and/or reported as inhomogeneous.

13. The flowmeter of claim 1, wherein the transmitter circuit is configured to effect a switching of the drive electronics from the first operating mode to the second operating mode as a function of time.

14. The flowmeter of claim 13, wherein the switching of the drive electronics from the first operating mode to the second operating mode occurs cyclically and/or such that the drive electronics is operated predominantly in the first operating mode and/or such that the drive electronics is operated in the first operating mode at least as long as operated in the second operating mode.

15. The flowmeter of claim 1, wherein the transmitter circuit is configured to perform a switching of the drive electronics from the first operating mode to the second operating mode cyclically such that the drive electronics change from the first operating mode to the second operating mode multiple times within a cycle and/or the drive electronics is operated within a cycle predominantly in the first operating mode and/or the drive electronics is operated within a cycle in the first operating mode at least so often and/or so long as in the second operating mode.

16. A method of measuring and/or monitoring a fluid medium to be measured, the method comprising:
   providing the flowmeter of claim 1;
   measuring the medium using the flowmeter; and/or
   monitoring the medium using the flowmeter, wherein the medium is:
     at least at times, flowing in a pipeline;
     a gas, a liquid or a dispersion; and
     at least at times, inhomogeneous and/or at least at times two-phase or multiphase.

17. The method of claim 1, wherein the measurement interval is more than a reciprocal of the wanted frequency and/or longer than 10 milliseconds.

* * * * *